United States Patent [19]
de Vosjoli et al.

[11] Patent Number: 5,713,304
[45] Date of Patent: Feb. 3, 1998

[54] VIVARIUM WITH RAISED LATERAL ACCESS PANEL AND RECESSED FRAME SEGMENTS

[76] Inventors: Patrick de Vosjoli, 3731 NE. 24th Ave., Lighthouse Point, Fla. 33064; Philippe de Vosjoli, 7424 Rondel Ct., San Diego, Calif. 92119

[21] Appl. No.: 443,240

[22] Filed: May 17, 1995

[51] Int. Cl.$^6$ ............................................. A01K 63/00
[52] U.S. Cl. ........................... 119/266; 119/452; 119/473; 119/501; 119/246
[58] Field of Search ............................. 119/266, 246, 119/267, 452, 453, 473, 481, 501, 245

[56] References Cited

U.S. PATENT DOCUMENTS

| | | | |
|---|---|---|---|
| 3,324,829 | 6/1967 | Dosamantes De José et al. | 119/262 |
| 3,563,204 | 2/1971 | Szilagyi | 119/267 |
| 3,786,781 | 1/1974 | Poulsen | 119/246 |
| 4,122,800 | 10/1978 | Mangarell | 119/246 |
| 4,844,016 | 7/1989 | Filosa | 119/481 |
| 5,010,845 | 4/1991 | Azpurua et al. | 119/452 |
| 5,183,004 | 2/1993 | Trent et al. | 119/246 |
| 5,272,316 | 12/1993 | Chesnut | 119/28.5 X |
| 5,404,839 | 4/1995 | Mancuso | 119/246 |
| 5,501,614 | 3/1996 | Tsuchiya | 119/266 X |

*Primary Examiner*—Gene Mancene
*Assistant Examiner*—Yvonne R. Abbott
*Attorney, Agent, or Firm*—John C. Smith

[57] ABSTRACT

A vivarium with a raised side access panel which allows reptiles to be approached laterally rather than from above. A lower glass panel below the side access panel permits the vivarium to hold water for amphibians while permitting side access to the reptiles inside. A frame structure is also provided which allows upper and lower frame segments to be interchanged. The upper frame segments allow the top lid to be permanently mounted such that a variety of equipment can be placed on the top cover of the vivarium without being disturbed when the vivarium is accessed through the side access panel. The shape of the frame segments form recessed bottom which can hold an optional heating element to control temperature in the vivarium from below.

20 Claims, 5 Drawing Sheets

VIVARIUM WITH RAISED LATERAL ACCESS PANEL AND RECESSED FRAME SEGMENTS

BACKGROUND OF THE INVENTION

1. Technical Field

The present invention relates to vivariums. In particular, it relates to vivarium structures with lateral access panels and recessed upper and lower frame segments.

2. Background Art

Early vivarium structures were typically ordinary aquarium tanks given a new use. While an aquarium structure can be used to house reptiles, amphibians, snakes, etc. (hereinafter collectively referred to as reptiles), the nature of these creatures are different from fish and as a result, an aquarium structure has disadvantages when placed in use as a vivarium.

A particular disadvantage of a conventional aquarium is caused by the relationship of predators to reptiles. For example, many reptiles living in the wild have reasonably good chances of success against land predators due to their speed and their ability to hide. A primary threat to reptiles is posed by birds which can strike from above with great speed. Many reptiles instinctively interpret movement from above as an attack. One disadvantage associated with the use of an aquarium structure for a vivarium is that during normal maintenance of the vivarium, reptiles may misinterpret a hand reaching into the tank as an attack. The terror experienced by reptiles in this situation is exacerbated by the fact that in the enclosed vivarium there is no place to run and hide as reptiles could do in the wild. It is not uncommon for some creatures, such as frogs, to suffer sufficient fright that they have heart attacks when startled by a hand moving down toward them. As a result, the top access provided by aquarium style tanks creates a situation where reptiles are placed in conditions of high stress leading to poorer health. In addition, the owner of the reptile is exposed to the possibility that an expensive exotic reptile may be harmed or even die from a heart attack when the vivarium is entered for normal maintenance. Certainly, the repeated stress generated every time the vivarium is entered will have an adverse effect on the reptiles health over time.

Since reptiles have a better chance of survival against land predators, approaching a reptile at eye level, rather than from above, does not create the same level of stress. With a lateral approach, the reptile associates the approaching hand with land based creatures and can try to move away or hide behind objects in the vivarium with less stress. Therefore, it would be advantageous to provide the ability to enter a vivarium from the side rather than from the top to create a less stressful and healthier environment for reptiles.

An additional drawback to aquarium structures is that equipment mounted on the top of the aquarium may have to be disconnected and moved to allow access. Reptiles are relatively fragile in terms of their ability to survive in hostile ecological environments. As a result, reptiles have more demanding requirements than fish which often results in the use of elaborate equipment mounted on a vivarium top cover than would be used in conjunction with an aquarium. For example, not only would a vivarium have a fluorescent lamp for illumination, but it may also have an incandescent lamp for localized heating, humidity control devices such as drip systems, temperature probes, etc. Of course, the more equipment mounted on top of the vivarium, the less user friendly it becomes to the person maintaining it. This user unfriendliness acts to discourage entry and maintenance of the vivarium which can lead to neglect of the reptiles. It would be advantageous to provide lateral access to the vivarium, thereby avoiding the need to move top mounted equipment.

A further drawback to aquarium structures is the lack of adequate ventilation. Reptiles require adequate ventilation to avoid a variety of health problems. For example, too much stagnant air and moisture can cause skin and respiratory problems. In addition, the heat lamps may cause undesirable temperatures without adequate ventilation. The glass walls of an aquarium prevent air flow. The stagnant air which results does not provide the cooling effect and air substitution which is beneficial and essential to reptile health. A further advantage of a front access panel 110, in addition to being able to approach the reptiles from a lateral direction, is that the opening around the access panel 110 can be designed to allow some air flow.

Vivariums are used not only to keep land reptiles, but also to keep amphibian reptiles by providing an environment which is partially submerged. Top access aquariums are typically used to provide an aquatic environment for these amphibian reptiles. To accommodate the portions of the tank which hold water, the traditional top access is required which brings with it all of the problems and disadvantages discussed above. A front access panel would be desirable if water could be maintained without leakage.

Aquariums typically have construction requirements dictated by the necessity that they be watertight. Construction needs for vivariums can differ markedly. Land dwelling reptiles do not require a watertight tank. Likewise, amphibian reptiles do not require that the entire tank be capable of holding water. It would be desirable to use tank construction techniques which are suitable for the unique and varying requirements of vivariums.

Another disadvantage associated with the use of aquarium tanks for vivariums is the flat structure of the tank bottom. Due to the flat lower surface, the bottom of the vivarium is closer to the surface of its support and may be more prone to temperature variations due to uncontrolled heat transfer. It would be desirable to control vivarium temperature from below as well as above, both by insulating the lower vivarium surface from the supporting table and also by providing a controllable heat source underneath the vivarium lower surface.

The prior art has failed to provide vivariums which address the needs of land and amphibian reptiles by providing side access to the vivarium without disturbing the equipment on the top of the vivarium, by providing a side access vivarium which can also hold water for amphibians, by providing a frame structure which avoids heat transfer due to surface contact, by providing the ability to place necessary devices such as heaters under the vivarium, and by providing a vivarium with a frame structure that is capable of solving the foregoing problems without additional equipment.

SUMMARY OF THE INVENTION

The present invention solves the foregoing problems by providing a vivarium which has a lower section capable of holding water for amphibians, an upper section which provides a lateral access panel to allow reptiles to be approached substantially at eye level, improved ventilation by allowing airflow into the vivarium around the edges of the lateral access panel, and a unique frame construction which provides a recessed floor to insulate the device from the table top, and provides a hidden enclosure for a lower heating element.

DESCRIPTION OF THE PREFERRED EMBODIMENT

For ease of discussion, the following terms will be used in this disclosure. The terms side access and lateral access will be used interchangeably. For convenience, the term reptile will be used to denote reptiles, amphibians, snakes, etc. Likewise, while glass is used in the preferred embodiment, the term "glass" as used herein describes not only the category of materials normally described as glass, but also any suitable alternative material such as plexiglass, plastic, etc.

Figure 1:
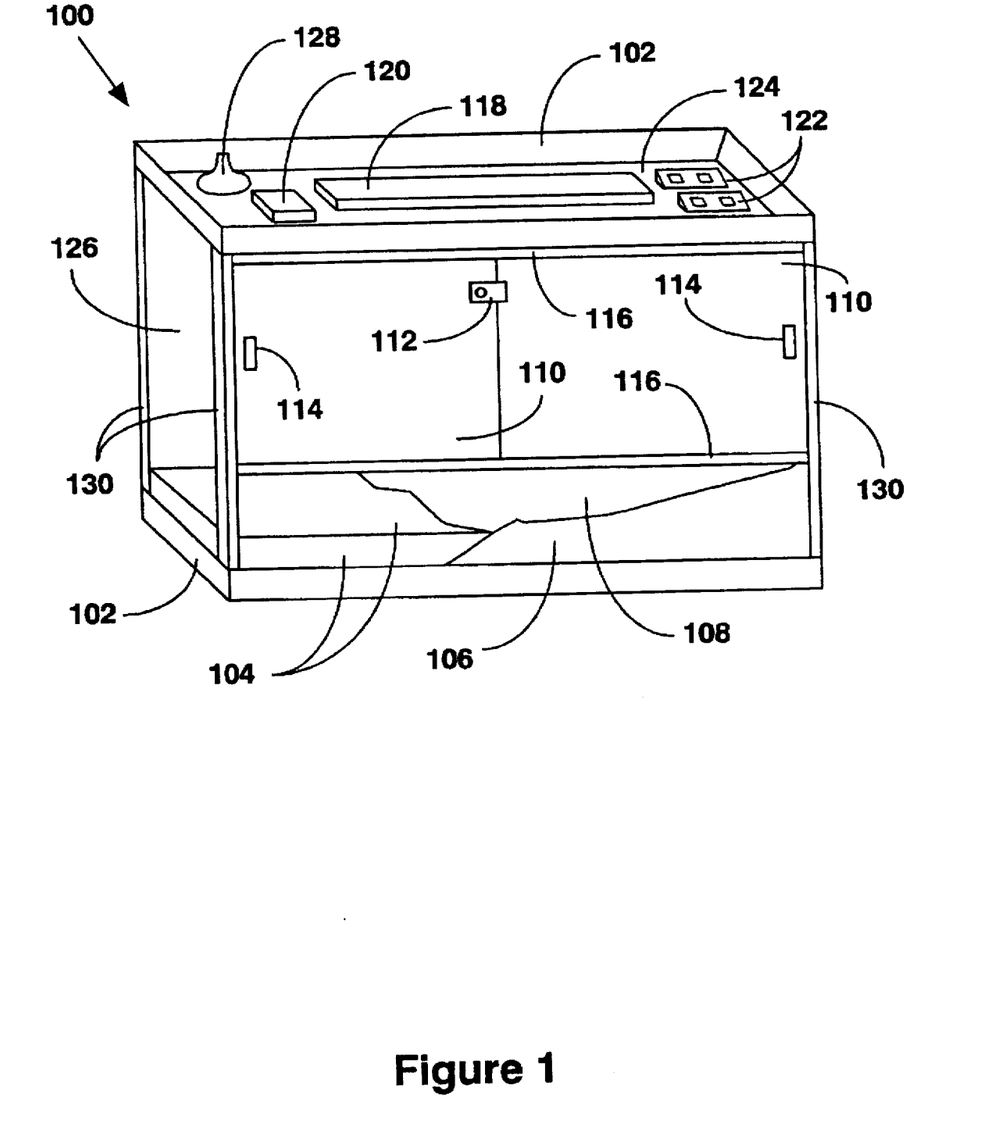
FIG. 1 is a diagram showing a perspective view of a preferred embodiment of the vivarium showing raised lateral access doors, a front watertight lower front panel, and the recessed frame segments.

Referring to FIG. 1, a preferred embodiment of the vivarium 100 is shown. The vivarium 100 uses side glass panels 126 as is customarily done. In addition, a lower panel 108 is provided which allows viewing of the substrate 106 of the land area of the vivarium as well as providing viewing of the water 104 area, both above and below the surface of the water 104. Of course, the lower section must be watertight in amphibian applications such as this. Above the lower panel 108 is a slider 116 which provides a sliding mount for access panels 110. The slider 116 has upper and lower portions to securely hold the access panels 110 at both ends. The access panels 110 are also constructed of glass to provide viewing of the reptiles.

In the preferred embodiment, finger grooves 114 are provided to allow the access panels 110 to be slid sideways for side access to the interior of vivarium 100. Those skilled in the art will recognize that any number of slider 116 or other rail or sliding mechanisms can be used, the only requirement being the ability to open an access panel 110 to permit lateral approach to the reptiles. Likewise, a hinged door mechanism can also be substituted for the slider 116 of the preferred embodiment. The size of access panels 110 is not critical, the only requirement being that the opening created by access panels 110 should be large enough to permit convenient access to maintain the vivarium 100. However, while other types of mechanisms can be used to provide access to the vivarium, the slider 116 used herein allows access to the vivarium 100 with the smallest opening. The advantage to minimizing the opening of the vivarium 100 is that vivariums typically have a variety of small, fast reptiles inside. Any number of them may seek to jump outside the vivarium 100 if sufficient opening was available. Therefore, the smaller access provided by the slider 116 provides a reduced risk that one of the reptiles will escape. An additional advantage of slider 116 over other access mechanisms is that slider 116 can be slightly opened such that additional ventilation is provided, but without leaving enough room for a reptile to escape.

An optional lock 112 is provided to secure the access panels 110. In the preferred embodiment, an ordinary showcase lock is used. However, any suitable lock can be used to secure the access panels 110.

A significant advantage of the access panels 110 is that the top cover 124 does not have to be removed to access the interior of the vivarium 100. This feature is of particular value to a vivarium 100 as opposed to a standard aquarium because vivariums typically require more top mounted equipment due to the fragile nature and health requirements of reptiles. By way of illustration, several pieces of equipment are shown. Illumination is provided by a fluorescent lamp 118 which is mounted on the top cover 124. It should be noted that vivariums typically use special purpose full spectrum fluorescent lamps which are designed to ensure that components of the light spectrum that are beneficial to the health of reptiles are provides. This type of lamp is well known in the art and commercially available from companies such as Zoo Med Laboratories, Inc., in San Luis Obispo, Calif., and Fluker Labs, inc. in Baton Rouge, La.

Monitoring devices 122 are also shown. These may be devices such as temperature or humidity monitors or controllers. Monitoring devices 122 such as humidity or temperature controllers are well known in the art and commonly available commercially from firms such as Microclimate Electronix in Oklahoma City, Okla. Fan 120 and heat lamp 128 are also shown as illustrative of a number of devices. Heat lamp 128 can be either a lamp which produces visible spectrum light or a ceramic lamp which provides heat, but no light. Ceramic heat lamps are commercially available from a variety of sources, such as Zoo Med Laboratories, Inc., in San Luis Obispo, Calif.

For ease of illustration, other devices, such as drip systems, automatic feeders, etc. are not shown, and the electrical power wiring has been omitted to provide more readable figures. Those skilled in the art will recognize that some or all of the foregoing devices can be used on a single top cover 124. Likewise, the top cover can be made from a variety of materials, including solid wood or metal boards, screening (to improve ventilation), or combinations of boards and screening. In the preferred embodiment, the top cover 124 is made from screening to improve ventilation. Solid panels (not shown) can be placed on top of the screening to control ventilation, humidity, or temperature as desired.

As can be seen the removal of the top cover 124 on a vivarium can be time consuming due to the number and type of equipment and the associated wiring which may need to be removed. The effect of top entry is to create a user unfriendly situation which discourages entry into vivarium 100. As a result, the reptiles may not receive the attention they need which results in adverse consequences for their health.

Another advantage of raising the access panels 110 is that a lower panel 108 may be used to provide a water tight bottom portion which in turn provides the ability to keep aquatic or amphibian reptiles while at the same time allowing side access to vivarium 100. By so doing, the user simultaneously has the convenience and reptile safety of side access and the ability to support amphibian reptiles. While any suitable material can be used to fabricate lower panel 108, the preferred embodiment uses glass to allow viewing of the water 104 from above or below the surface, and also to allow viewing the land substrate both for esthetic reasons as well as practical reasons such as checking moisture levels, etc.

In addition to the convenience of lateral entry, an additional advantage is that the stress experienced by the reptiles is also reduced by lateral entry. As discussed above, the most dangerous reptile predators are birds. The effect of reaching in from the top of a vivarium can cause significant levels of terror to a reptile because motion from above may be interpreted as an attacking bird. The amount of stress engendered cause serious detriment to the reptiles health, including heart attacks. By using access panels 110, the owners hand approaches the reptile substantially at eye level. The threat posed by predators encountered by reptiles at this level is much less and produces correspondingly lower levels of stress. As a result, the general health of the reptile can be enhanced by reducing the level of stress that is imposed during normal maintenance of the vivarium 100.

Also shown in FIG. 1 are upper and lower frame segments 102. In the preferred embodiment, frame segments 102 are identical. Also in the preferred embodiment, the frame segments 102 are constructed from aluminum. However, any material can be used which is suitable for vivarium use. The upper frame segment 102 rises above the surface of top cover 124, forming a recessed area 212 (shown also in FIG. 2) into which top cover 124 is attached. The lower frame segment 102 is inverted such that it also forms a recessed area 204 (discussed more fully below in regard to FIG. 2) under vivarium 100. Side frame segments 130 extend between upper and lower frame segments 102. The depth of the recessed areas 204, 212 can be any suitable size which meets the esthetic criteria of the designer. The only requirement is that the depth of the lower recessed area 204 must be sufficient to accommodate any equipment placed under the vivarium 100.

For ease of illustration, a conventional rectangular vivarium 100 is shown. However, those skilled in the art will recognize that any shape may be selected for vivarium 100 which suits a particular desired appearance, including square, triangular, polygonal, cylindrical, etc. It is even possible to fabricate the side walls of vivarium 100 as a cylinder with the upper and lower frame segments 102 shaped as rings. The only requirements are that the raised access panels 110 allow side entry to the vivarium 100 such that the reptile is not alarmed, and also to permit the use of a lower panel 108 to provide a watertight area for amphibians.

Figure 2:
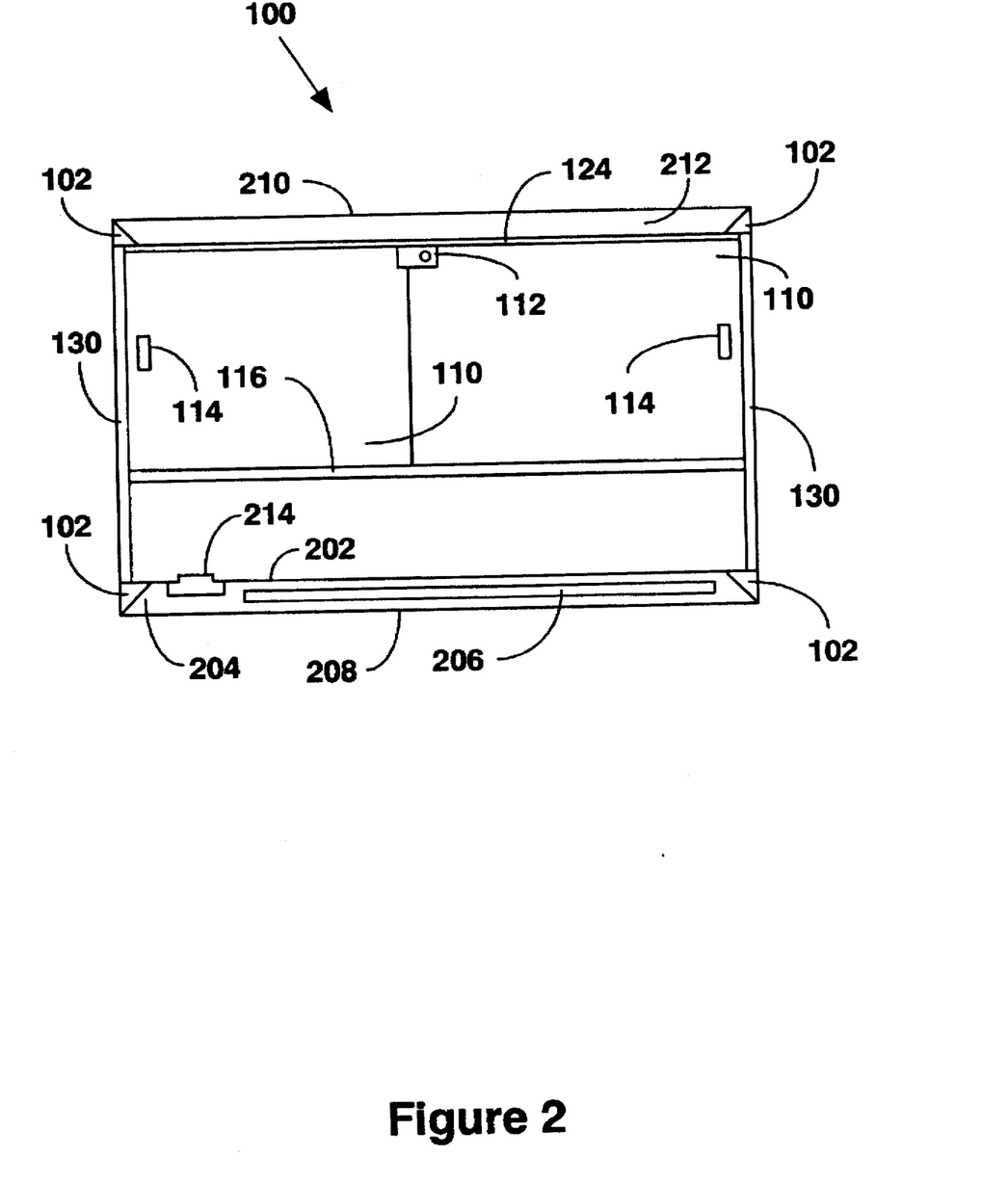
FIG. 2 is a diagram of showing a rear cutaway view of the embodiment of FIG. 1 with a recessed floor.

For ease of illustration, the electrical power wiring for the heating 206 and other electrical equipment were not shown. In the preferred embodiment, if a hidden heating element 206 were used, the wiring would be run through the opening in the vivarium stand (not shown).

FIG. 2 is a rear cutaway view of the vivarium 100 discussed above in regard to FIG. 1. Recessed lower area 204 and recessed upper area 212 are formed by the extension of the edges of frame segments 102 past the floor 202 of vivarium 100 and the top cover 124. The lower frame segment 102 forms a recessed area 204 which is equal to the distance between the bottom edge 208 of lower frame segment 102 and the floor 202 of vivarium 100. Likewise, the upper frame segment 102 also forms a recessed area 212 which is equal to the distance between the top edge 210 of upper frame segment 102 and the upper surface of top cover 124.

An advantage to the recessed areas 204, 212 is that a variety of equipment can be concealed from view during ordinary use. For example, recessed lower area 204 provides space underneath vivarium floor 202 for an optional heating element 206. The heating element 206 provides the ability to control temperature from below the vivarium 100. Thermostatically controlled heating elements 206 are well known in the art and are commercially available from companies such as Thermotronics, Inc. in Sweetwater, Tenn., etc. If used in conjunction with a heat lamp mounted on the top cover 124, the temperature inside vivarium 100 can be controlled more precisely to suit the requirements of a particular species of reptile.

In addition, the recessed lower area 204 also provides insulation to vivarium 100 by distancing the bottom surface of vivarium 100 from the supporting surface on which it rests. The recessed upper area 212 partially blocks the view of the equipment, and depending on the mechanical design of the equipment used in conjunction with top cover 124, a decorative cover (not shown) may be placed over top cover 124 to completely conceal the equipment mounted on top of vivarium 100. A principle advantage of the design used herein is that the top and bottom frame segments 102 can be made from identical parts, thereby reducing the cost of manufacture.

Due to the recessed area 204, a closable plug 214 can be placed in the floor of the vivarium. The plug 214 allows more convenient draining and cleaning of the vivarium 100. The use of a plug 214 would be impossible on a prior art flat bottomed aquarium or vivarium if the vivarium was intended to be placed on a flat surface such as a table top. Recessed area 204 provides enough room to allow bottom mounted equipment to be used with vivarium stands or with standard flat table surfaces.

Therefore, a further advantage of the recessed area is that while vivariums and aquariums are typically mounted on stands custom designed for them, the recessed area allows the vivarium to be placed on a flat table instead of a vivarium stand while still permitting use of features such as the heating element 206 or plug 214, which could not be used with a standard aquarium or vivarium bottom.

Figure 3A:
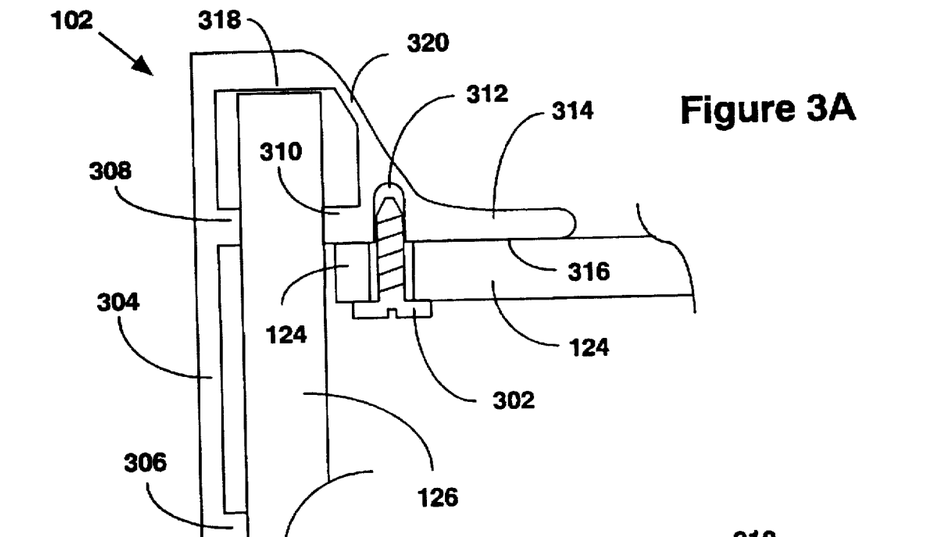
FIG. 3A is a detailed end view showing the recessed frame used in a preferred embodiment. The recessed frame is shown mounted on a side glass panel with the top cover attached.

In FIG. 3A, a more detailed end view of a preferred embodiment of the invention is shown. Upper frame segment 102 is shown in the assembled state. Side wall 304 is substantially aligned with the side glass panel 126. Side glass panel 126 is slid into upper frame segment 102 until it comes to rest against end wall 318. Finger extensions 306, 308 provide pressure against one side of side glass panel 126 while opposing finger extension 310 provides pressure to the other side of side glass panel 126. The pressure can be such that side glass panel 126 is held securely without any adhesive. However, those skilled in the art will recognize that a suitable adhesive, used in conjunction with the natural structural stability of the frame disclosed herein, will enhance the overall stability of the vivarium 100.

Figure 4A:
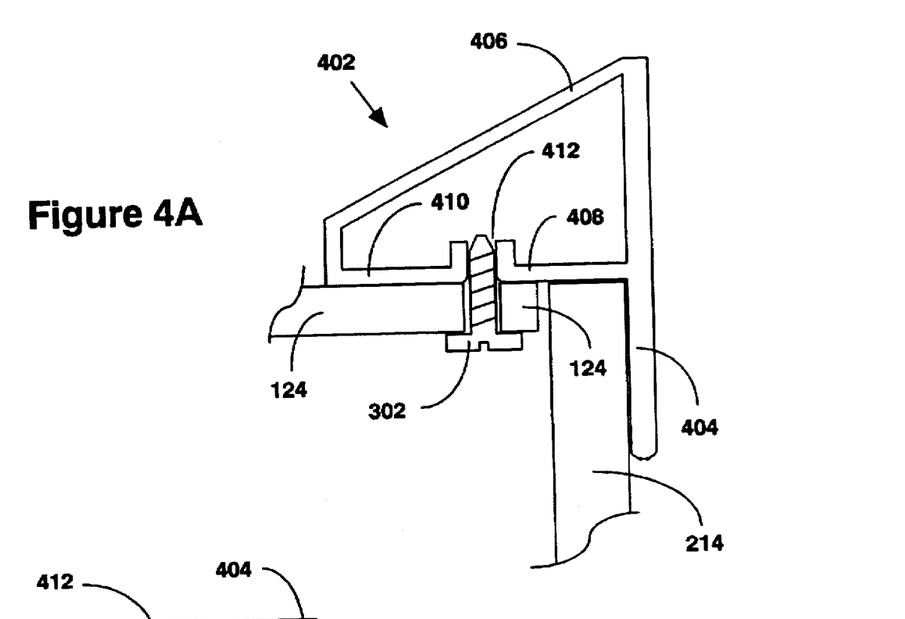
FIG. 4A is a detailed end view of an alternative embodiment of the recessed frame. The recessed frame is shown mounted on a side glass panel with the top cover attached.

Top wall 314 extends outward from the plane of side wall 304 in a substantially perpendicular direction. Top wall 314 is offset from the edge of end wall 304 by offset wall 320 to provide the recessed area 212 discussed above. Top cover 124 is attached to the inner surface 316 of top wall 314 by a screw 302 which is screwed into a groove 312 that travels the length of frame segment 102. Those skilled in the art will recognize that a variety of other devices, such as rivets, etc., may be substituted for screws 302. The advantage of using a groove rather than predrilled holes is that alignment problems are eliminated, as well as concerns related to stripped threads. Further, manufacturing costs are reduced since the operation required to place and drill the holes is eliminated. Of course, the groove does not have to run the entire length of the frame segment 102. However, frame segment 102 is less expensive to manufacture if a single continuous groove (or channel as in the embodiment of FIG. 4) is used rather than smaller grooves which are located at measured points on the frame segment 102.

Figure 3B:
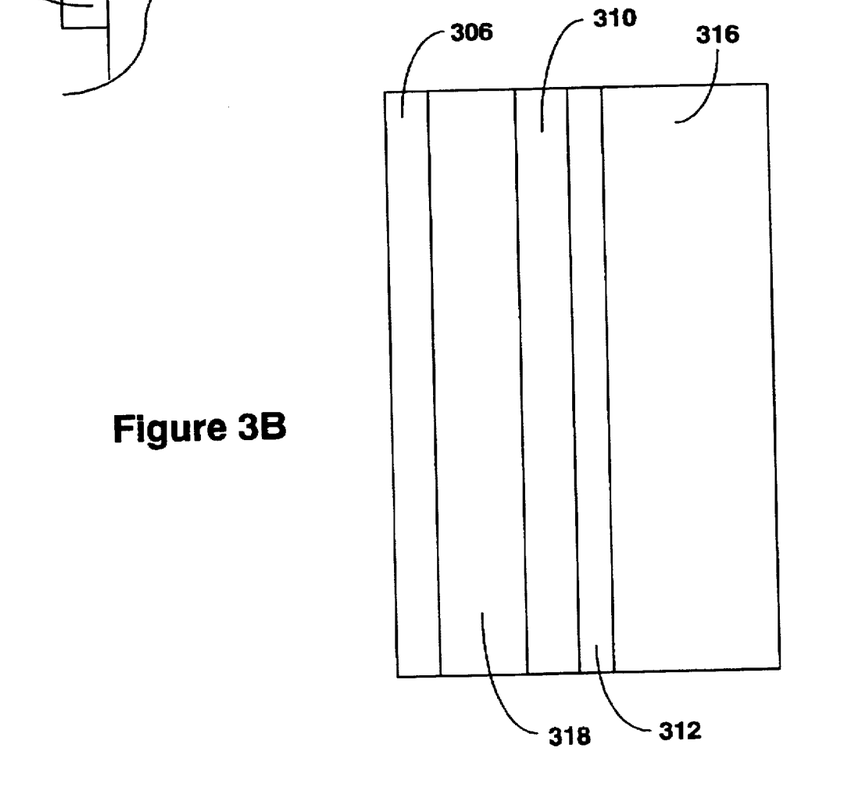
FIG. 3B is a bottom view of the embodiment illustrated in FIG. 3A.

FIG. 3B shows a bottom plan view of frame segment 102 in the disassembled state. As can be more clearly seen in this view, groove 312 extends the length of frame segment 102.

Figure 4B:
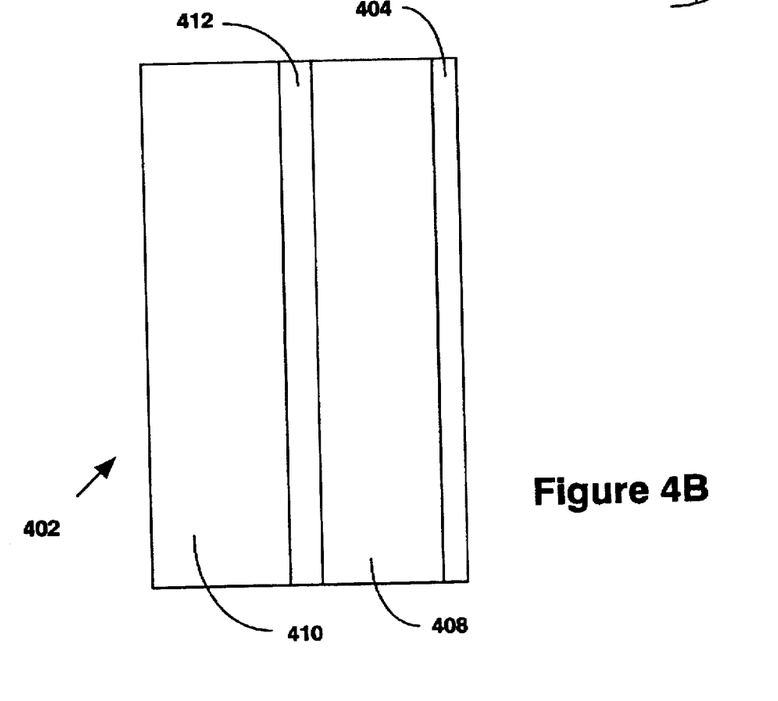
FIG. 4B is a bottom view of the embodiment illustrated in FIG. 4A.

FIG. 4, showing frame segment 402, is an alternative embodiment of the device discussed above in regard to FIG. 3. In this device, groove 312 is replaced with channel 412 which performs the same function of holding the screws 302 when top cover 124 is mounted to upper frame segment 402. Extensions 408, 410 form channel 412. In this embodiment, side glass panel 214 is secured to upper frame segment 402 with adhesives in the conventional manner used by common aquariums. The sloping surface 406 of frame segment 402 provides the recessed area 212 when assembled. In addition to the recessed areas 204, 212 provided by frame segments 402, channel 412 of frame segments 402 effectively provides an equivalent to the groove 312 in frame segment 102. Extension 404 extends from outward from frame segment 402 and adjoins side glass panel 126.

While either embodiment can be used for an amphibian vivarium with proper caulking, the preferred embodiment uses the embodiment of FIG. 4 for amphibian vivariums due to its simpler construction, and the embodiment of FIG. 3 for non-amphibian vivariums. In both embodiments, the floor 202 of the vivarium 100 is not attached to the frame segments 102 with screws 302. Rather, the floor 202 is attached frame segments 102 via the customary methods used to assemble aquariums and vivariums, namely adhesives. The presence of the groove 312 or channel 412 on the lower frame segment 102 is of no consequence since the available surface which can have adhesive applied is adequate to seal the vivarium 100. Of course, if the vivarium 100 is not intended to hold water, then screws 302 could also be used to secure the floor 202 to the lower frame segments 102.

In both embodiments, the frame segments 102, 402 can be used interchangeably as upper or lower frame segments. In the preferred embodiment, the groove 312 or the channel 412 would not be used to hold screws 302 when the frame segments 102, 402 are used as lower frame segments. However, those skilled in the art will realize that depending on the materials used to fabricate floor 202, screws may be used to attach the floor 202 to lower frame segments 102 or 402. Both embodiments provide for ease of assembly, both provide ease of attachment of top cover 124, both provide a hidden recessed area 204 for a heating element 206 and both provide a recessed area at the top and bottom of the vivarium 100.

Figure 5:
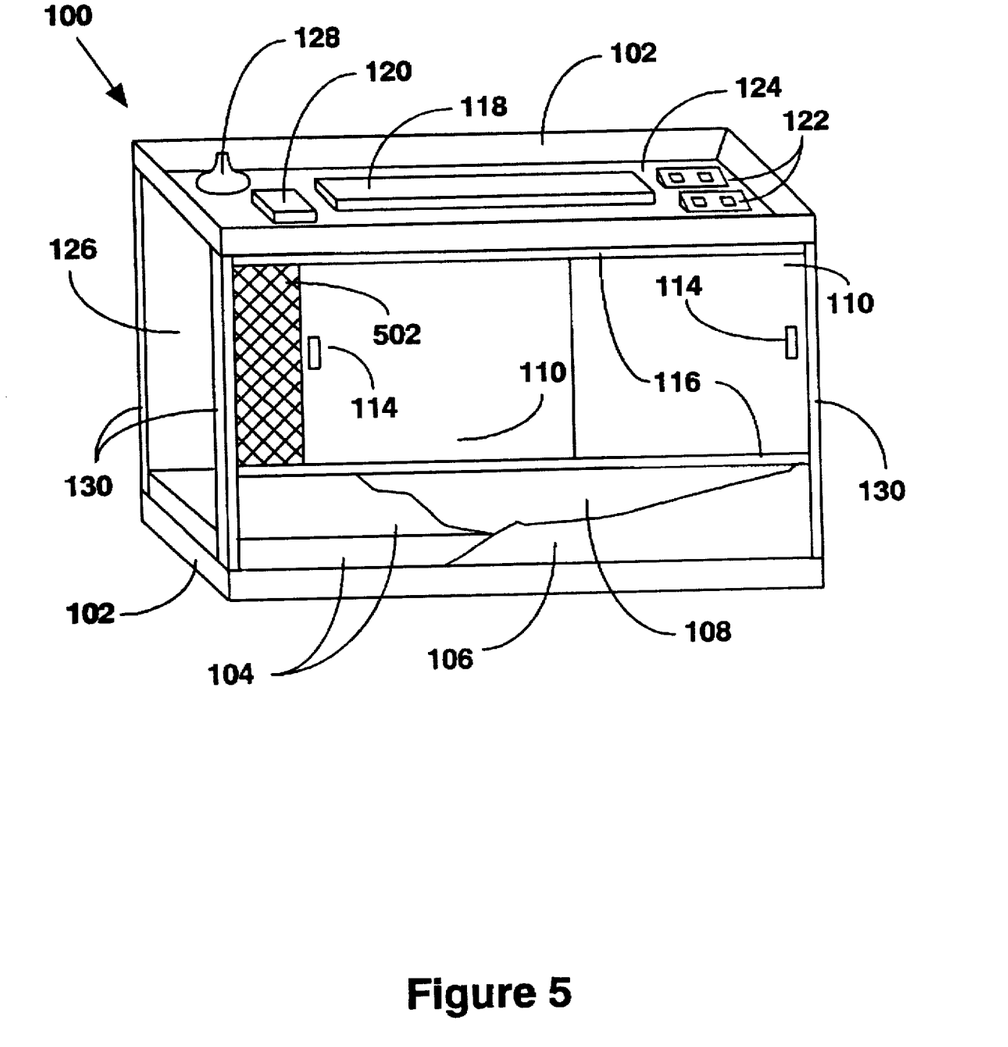
FIG. 5 illustrates an alternative ventilation screen used in conjunction with the embodiment of FIG. 1.

In FIG. 5, a ventilation screen 502 is mounted on the vivarium 100 embodiment of FIG. 1. In the preferred embodiment, this optional ventilation screen 502 is mounted in slider 116 and is held securely in place by access panel 110. The advantage of ventilation screen 502 is that it can provide more ventilation for the reptiles within. Inadequate or improper ventilation is a primary cause of reptile health problems and death when reptiles are kept in a vivarium. By providing addition controllable ventilation, ventilation screen 502 can extend the life span and general health of the reptiles. In addition, since access panels 110 are raised above lower panel 108, this side ventilation can be provided even in an amphibian vivarium.

While the invention has been described with respect to a preferred embodiment thereof, it will be understood by those skilled in the art that various changes in detail my be made therein without departing from the spirit, scope, and teaching of the invention. For example, a variety of materials can be used to manufacture the frame segments, the shape of the frame segments can vary to provide any number of recessed area depths. Either frame segment can be used with or without caulking depending on its intended use as an amphibian or non-amphibian vivarium. The side access panels can also be implemented in a variety of ways, either through sliding panels as shown, by hinged doors, by removable panels, etc. Accordingly, the invention herein disclosed is to be limited only as specified in the following claims.

We claim:

1. A vivarium, comprising:

at least one side wall;

a floor;

a lower frame segment having a lower edge and an upper edge, the lower frame segment attached to at least one side wall and to the floor such that the floor is raised above the lower edge of the lower frame segment to form a recessed area beneath the floor;

at least one access panel in at least one side wall having a sufficient size to permit lateral entry into the vivarium; and at least one lower panel between the floor and at least one access panel, such that the bottom of the access panel is raised above the floor, the space between the floor and the bottom of the access panel forming a leak proof area within the vivarium;

whereby lateral entry to the vivarium is made at a point above the level of the floor which prevents spillage of materials in the leakproof area when the access panel is opened.

2. A vivarium, as in claim 1, further comprising:

a slider attached to the lower panel, the slider providing a travel path for at least one access panel such that the access panel can create an opening when it is slid from a closed to an open position; and a screen, capable of removable attachment to the slider such that when at least one access panel is in the open position the screen substantially covers the opening made by the access panel.

3. A vivarium, as in claim 1, wherein the lower frame segment is attached to at least one side wall and the lower panel such that a substantially waterproof seal is formed.

4. A vivarium, as in claim 3, further comprising:

a slider attached to at least one lower panel, the slider providing a travel path for at least one access panel such that the access panel can create an opening when it is slid from a closed to an open position; and a screen, capable of removable attachment to the slider such that when at least one access panel is opened the screen substantially covers the opening made by at least one access panel.

5. A vivarium, as in claim 4, further comprising:

an aperture in the floor; and a sealable plug attached to and extending through the floor.

6. A vivarium, as in claim 3, further comprising:

a top cover having an upper surface; and an upper frame segment having an upper edge, the upper frame segment attached in one plane to at least one side wall and in another plane to the top cover such that the upper surface of the top cover is recessed below the upper edge of the upper frame segment to form a recessed area above the top cover.

7. A vivarium, as in claim 6, further comprising:

a groove running substantially the length of the upper frame segment; and the upper frame segment attached to the top cover by screws which are screwed into the groove.

8. A vivarium, as in claim 6, further comprising:

a channel running substantially the length of the upper frame segment; and the upper frame segment attached to the top cover by screws which are screwed into the channel.

9. A vivarium, as in claim 3, further comprising:

a temperature monitoring device; and a heating element concealed in the recessed area beneath the floor, the heating element activated under control of the temperature monitoring device;

whereby the temperature in the vivarium can be controlled from beneath the floor of the vivarium and the heating element can be concealed from view.

10. A vivarium, as in claim 9, further comprising:

an aperture in the floor; and a sealable plug attached to and extending through the floor.

11. A vivarium, as in claim 1, further comprising:

a temperature monitoring device; and a heating element concealed in the recessed area beneath the floor, the heating element activated under control of the temperature monitoring device;

whereby the temperature in the vivarium can be controlled from beneath the floor of the vivarium and the heating element can be concealed from view.

12. A vivarium, as in claim 9, further comprising:

a slider attached to at least one lower panel, the slider providing a travel path for at least one access panel such that the access panel can create an opening when it is slid from a closed to an open position; and a screen, capable of removable attachment to the slider such that when at least one access panel is opened the screen substantially covers the opening made by at least one access panel.

13. A vivarium, as in claim 1, further comprising:

a top cover having an upper surface; and an upper frame segment having an upper edge, the upper frame segment attached in one plane to at least one side wall and in another plane to the top cover such that the upper surface of the top cover is recessed below the upper edge of the upper frame segment to form a recessed area above the top cover.

14. A vivarium, as in claim 13, further comprising:

a groove running substantially the length of the upper frame segment; and the upper frame segment attached to the top cover by screws which are screwed into the groove.

15. A vivarium, as in claim 13, further comprising:

a channel running substantially the length of the upper frame segment; and the upper frame segment attached to the top cover by screws which are screwed into the channel.

16. A frame segment for a vivarium, comprising:

a side wall having a top edge; and a top wall, separated from the side wall and extending outward from the side wall;

an offset wall extending from the top of the side wall to the top wall, the top wall offset from the top edge of the side wall such that the top edge of the side wall is at a higher position than the top edge of the top wall during use;

a groove capable of accepting screws along substantially the length of the lower surface of the top wall.

17. A frame segment, as in claim 16, further comprising:

a first finger extension on the side wall, projecting inward towards the top wall;

an opposing finger extension on the top wall, substantially aligned with and opposing the first finger extension, the opposing finger extension and the first finger extension separated a sufficient distance such that they can snugly accept a glass panel inserted between them.

18. A frame segment, as in claim 17, further comprising a second finger extension on the side wall, projecting inward towards the top wall, the second finger extension located between the first finger extension and the bottom of the side wall, the second finger extension extending substantially in the direction of the top wall.

19. A frame segment for a vivarium, comprising:

a side wall having a top edge;

a first top wall portion, extending outward from the side wall;

a second top wall portion, aligned with the first top wall portion and separated from the first top wall portion by a channel; and an offset wall extending from the top of the side wall to the distal end of the second top wall, the first and second top wall portions offset from the top edge of the side wall such that the top edge of the side wall is at a higher position than the top edge of the top wall during use.

20. A frame segment, as in claim 19, wherein the channel has a predetermined width suitable for accepting mounting screws.

* * * * *